(12) United States Patent
Gutierrez

(10) Patent No.: US 6,519,233 B1
(45) Date of Patent: Feb. 11, 2003

(54) SUBSCRIBER UNIT BURST MODE RESERVATION IN A CODE DIVISION MULTIPLE ACCESS WIRELESS COMMUNICATION SYSTEM

(75) Inventor: Alberto Gutierrez, Plano, TX (US)

(73) Assignee: Nortel Networks, Ltd., St. Laurent (CA)

( * ) Notice: Subject to any disclaimer, the term of this patent is extended or adjusted under 35 U.S.C. 154(b) by 0 days.

(21) Appl. No.: 09/329,856

(22) Filed: Jun. 11, 1999

Related U.S. Application Data

(60) Provisional application No. 60/089,154, filed on Jun. 12, 1998, and provisional application No. 60/098,817, filed on Sep. 2, 1998.

(51) Int. Cl.[7] .............................................. H04B 7/216
(52) U.S. Cl. ...................... 370/320; 370/335; 370/346; 455/450
(58) Field of Search ................................ 370/320, 329, 370/335, 342, 346; 455/450, 561, 509, 517

(56) References Cited

U.S. PATENT DOCUMENTS 5,729,542 A * 3/1998 Dupont ........................ 370/346
6,236,646 B1 * 5/2001 Beming et al. ............. 370/335

FOREIGN PATENT DOCUMENTS

| EP | 0 993 211 A | 4/2000 |
| WO | WO 97 11566 A | 3/1997 |
| WO | WO 98 37669 A | 8/1998 |
| WO | WO 99 04592 A | 1/1999 |
| WO | WO 99 13600 A | 3/1999 |
| WO | WO 99 21375 A | 4/1999 |

\* cited by examiner

*Primary Examiner*—Edward F. Urban
*Assistant Examiner*—Erika A. Gary
(74) *Attorney, Agent, or Firm*—Bruce E. Garlick; John O. Crane

(57) ABSTRACT

A CDMA communication system supports designated mode data bursts on a reverse link contention based channel from a subscriber unit to a base station. The reverse link contention based channel also supports contention-based transmissions from the subscriber unit to the base station. When transmissions are scheduled and serviced in the designated mode data burst, collisions are avoided. Further, because setting up the designated mode data bursts on the reverse link contention based channel require little overhead as compared to the setup of a traffic channel the CDMA system is operated at a greater efficiency. The reverse link contention based channel may be a Reverse Common Control Channel, a Reverse Access Channel or another contention-based channel. Designated mode data bursts on the reverse link contention based channel may consume a single slot or multiple slots. The number of slots consumed in the designated mode data bursts depends upon the volume of data the subscriber unit has to transmit to the base station. The subscriber unit may state the amount of data it desires to transmit in the designated mode data burst. Based upon this stated amount, the base station may reserve multiple slots for the designated mode data burst. Then, the subscriber unit will transmit data during the slots.

25 Claims, 12 Drawing Sheets

SUBSCRIBER UNIT BURST MODE RESERVATION IN A CODE DIVISION MULTIPLE ACCESS WIRELESS COMMUNICATION SYSTEM

CROSS-REFERENCES TO RELATED APPLICATIONS

The present application claims priority pursuant to 35 U.S.C. Sec. 119(e) to U.S. Provisional Application Serial No. 60/089,154, filed Jun. 12, 1998, pending, and to U.S. Provisional Application Serial No. 60/098,817, filed Sep. 2, 1998, pending, both of which are hereby incorporated herein by reference in their entirety.

BACKGROUND

1. Field of the Invention

The present invention relates generally to cellular wireless communications and more particularly to the transmission of data on a contention based reverse channel in a code division multiple access (CDMA) cellular wireless communication system.

2. Description of the Related Art

Cellular wireless communication systems are generally known to include a plurality of base stations dispersed across a geographic service area. Each of the base stations includes at least one antenna and a base station transceiver system (BTS) and provides wireless service within a respective cell. The BTSs couple to base station controllers (BSCs) with each BSC serving a plurality of BTSs. Typically, the-BSCs also couple to a mobile switching center (MSC) which interfaces to the Public Switched Telephone Network (PSTN) and other MSCs. Together, the BTSs, BSCs and the MSC form a wireless network, which provides wireless coverage to mobile stations (MSs) operating within a respective service area.

Wireless communication systems operate according to various protocol standards. One particular protocol standard in place worldwide is the CDMA protocol standard. CDMA is a direct sequence spread spectrum system in which multiple spread spectrum signals are transmitted and received simultaneously over a common frequency band. In the CDMA system, each mobile station (MS) may be assigned a distinct Walsh code, which identifies the signals, transmitted to and received from the MS.

In an example of operation thereunder, forward link signals from a BTS to a first MS are coded with a first Walsh code and then transmitted where the process of transmission includes pseudo noise (PN) scrambling (spreading). Likewise, forward link signals transmitted from the BTS to the second MS are coded with a second Walsh code and then transmitted, perhaps concurrently with transmissions from the BTS to the first MS. The first MS's receiver receives at its antenna all of the energy transmitted by the BTS. However, because Walsh code channels are orthogonal, after correlating the received signal with the first Walsh code, the despreader outputs all the energy intended for the first MS but none of or only a small fraction (i.e., due to orthogonality loss) of the energy intended for the second, third, etc., MS. Likewise, the second MS correlates the received forward link signal with the second Walsh code to receive its intended forward link energy. Each of the MSs then operates upon the despread signal energy to extract data intended for the respective MS. The number of users accommodated on the forward link is limited by intra-cell interference due to orthogonality loss, inter-cell interference and other interference such as that due to thermal noise.

In some specialized applications (e.g., fixed access) it may be considered to design a system such that orthogonal codes (e.g., Walsh codes) separate the signals of the reverse link users. However, for all CDMA systems currently deployed and reported in the literature, the reverse link is strictly interference limited, that is, one user's reverse link energy at the base station receiver acts as interference to other users signals. Thus, in the typical case, a plurality of MSs transmit to the BTS simultaneously on the reverse link with each reverse link transmission spread by a unique PN code or PN code shift. A receiver of the BTS receives the composite reverse link signal and despreads the reverse link transmissions with expected PN code to extract signals received from the first, second, third, etc., MS. The BTS then operates upon each despread signal to extract data sent by the MSs.

Wireless communication systems were originally designed and constructed to service voice communications. However, as packet data communications have increased in popularity, wireless communication systems have been called upon to service not only voice communications but packet data communications as well.

Examples of packet data communications supported by wireless communication systems include Internet sessions, electronic mail transfer, electronic file transfers, and short message services, among other services. Human users of the wireless communication system typically initiate these packet data communications. However, electronic devices may also access the wireless communication system, such devices including vending machines, credit card machines, ATMs and other computer controlled electronic devices. The wireless communication system provides a convenient and cost-effect method for sending packet data transmissions when a landline is not available.

Packet data communications place demands upon wireless communication systems that differ from those placed by voice communications. While voice communications require a substantially constant bandwidth, packet data transmissions are "bursty", with high bandwidth required during some time periods and little or no bandwidth required during other time periods. In servicing either voice or packet data communications, limited channel resources must be assigned. The setup and initialization of a traffic channel in a CDMA system (for either packet data communications or voice services) requires between 20 and 30 frames. In a typical packet data session, once the traffic channel is setup, packet data transmissions between a MS and a BS will occur for a short period of time to complete the setup of the packet data session at all protocol levels. After the initial setup, the packet data transmissions are typically bursty, with periods of inactivity intermixed with bursts of data. Thus, the traffic channel may become idle for periods of time.

According to traffic channel management operations, when a traffic channel is idle for a period of time, e.g., one minute, the traffic channel is released. Thus, during a packet data session, when the traffic channel is inactive for the period of time, it is released. The release of the traffic channel does not, however, release the logical connection established for the MS via higher protocol layers (i.e., above the physical layer). For example, although the physical connection via the traffic channel may be terminated during periods of inactivity, the IP address of the mobile node, call control, and service information is maintained by the network. When the traffic channel is required again, it is again setup. This operation, in combination with the bursty nature of packet data communications requires the frequent allocation and release of traffic channels. Because the setup of a traffic channel consumes significant overhead (e.g., 20 to 30 frames of setup information on the traffic channel before transmission of user data), continued allocation and deallocation of traffic channels in servicing packet data communications is undesirable.

Many packet data communications transfer very little data after the initial setup of a logical link between a MS and a remote computer. For example, credit card verification services require the transmission of a relatively small number of frames of data. This amount of data does not justify the reallocation of a traffic channel since more frames would be consumed in setting up the traffic channel than would be used in transmitting the packet data. Thus, subsequent traffic channel allocation after the initial packet data communication setup of a logical link is not justified for this reason as well.

Responsive to these concerns, reverse link channels have been standardized for the transmission of reverse link packet data transmissions (and messages) from the MS to the BS. An example of an interference-based reverse link channel in a CDMA system is the reverse link access channel (R-ACH); a contention based channel that is defined within the IS-95 standard. The R-ACH employs the well-known Slotted Aloha protocol, where for IS-95 each slot is comprised of a preamble followed by a message capsule. The preamble is typically 3 to 4 frames and the message capsule is typically 4 to 10 frames. In transmitting packet data on the R-ACH, a MS simply initiates transmission, attempting to successfully complete the transmission to the base station without a collision (i.e., another mobile station trying to send a message during the same slot) from other MSs. Thus, some probability exists that the transmission will be received by the BS without contention from other MSs. The probability of successful transmission to the BS on the R-ACH decreases as the loading increases or with services that require more frequent access via the R-ACH such as telemetry, packet data, or credit card applications. Thus, as usage of the CDMA cellular system increases with new packet data applications the ability to effectively use the R-ACH decreases.

Another problem faced in using the R-ACH relates to the power control of transmissions on the R-ACH. The MS uses the received power of forward link transmissions to estimate the transmission power to use for reverse link transmissions (open loop power control). Based upon its estimate of the transmission power, the MS sends a transmission to the BS on the R-ACH. If the BS does not acknowledge receipt of the transmission, the MS increases its transmission power and retransmits. This process is repeated until the BS acknowledges the transmission or a maximum number of tries have attempted, in which case, the MS ceases its transmissions. Thus, fast closed loop power control does not exist for the R-ACH and the R-ACH channel requires a higher power for effective operation compared to channels which benefit from fast closed loop power control.

Thus, there exists a need in the art for a CDMA system, which has a viable mechanism for satisfying bursty packet data transmissions. Further such mechanism should satisfy the data transmission requirements of a MS without intervention of the BS. According to this mechanism, power control and collision avoidance should be managed on a reverse link channel for support of heavy cell loading and bursty packet communications on the reverse link.

SUMMARY OF THE INVENTION

In order to overcome the shortcomings among other shortcomings of prior CDMA systems, a communication system constructed according to the present invention supports designated mode data bursts on a reverse link contention based channel from a subscriber unit to a base station. This reverse link contention based channel also supports contention-based transmissions from the subscriber unit to the base station. As contrasted to the prior systems, the subscriber unit may reserve the designated mode data burst via a reservation request message.

When transmissions are scheduled and serviced in the designated mode data burst, collisions are avoided. This increases throughput and efficiency of the reverse link contention based channel. Thus, the reverse link contention based channel is more efficiently operated. Further, because setting up the designated mode data bursts on the reverse link contention based channel require little overhead as compared to the setup of a traffic channel the CDMA system is operated at a greater efficiency.

Operation of the subscriber unit and the base station may be substantially compliant with CDMA 2000. In such case, the reverse link contention based channel may comprise the Reverse Common Control Channel. Under operation that is substantially compliant with the IS-95 operating standards, the reverse link contention based channel may comprise the Reverse Access Channel.

Designated mode data bursts on the reverse link contention based channel may consume a single slot or multiple slots. The number of slots consumed in the designated mode data bursts depends upon the volume of data the subscriber unit has to transmit to the base station. Thus, in a designated mode reservation request message (transmitted on the reverse link contention based channel in a contention-based mode), the subscriber unit may state the amount of data it desires to transmit in the designated mode data burst. Based upon this stated amount, the base station may reserve multiple slots for the designated mode data burst. Then, the subscriber unit will transmit data during the slots.

The base station may initiate a designated burst mode transmission from the subscriber unit without a reservation request from the subscriber unit. Such operation may be performed, for example when a logical data session was previously set-up and a response from the subscriber unit is expected after the expiration of a particular time period. Upon the expiration of the time period, the base station will send a designated mode assignment message to the subscriber unit. The subscriber unit will then respond with a designated mode data burst. Similarly, such operation may be performed, for example, after the occurrence of some event in the system.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
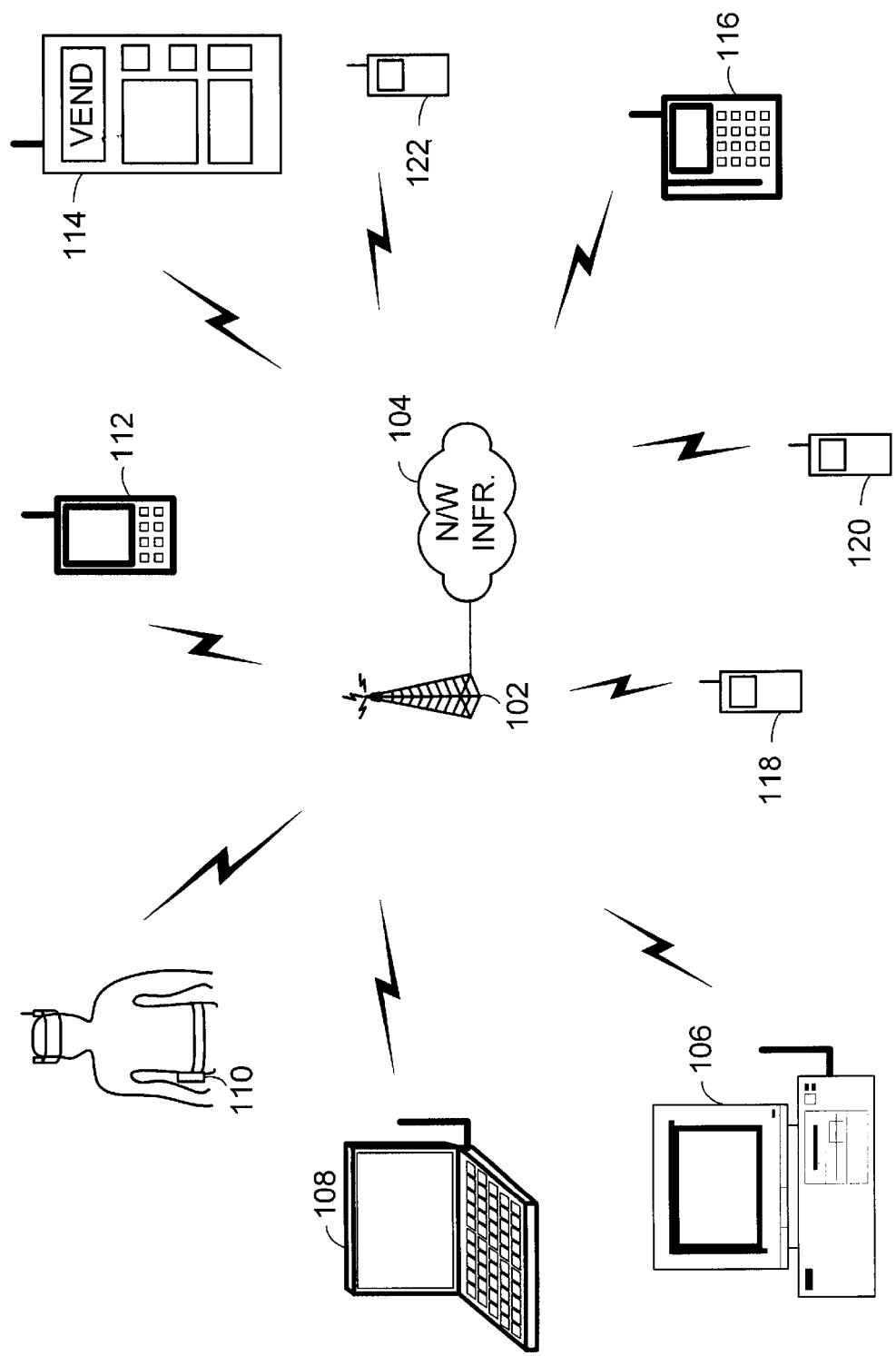
FIG. 1 is a system diagram illustrating a portion of a CDMA cellular system 100 in which a plurality of subscriber units 106–122 contend for reverse link channels, receive reservations for designated transmissions on the reverse link channels, transmit upon the reverse link channels and operate to perform reverse link power control upon the reverse link channels, all according to the present invention.

FIG. 1 is a system diagram illustrating a portion of a CDMA cellular system 100 in which a plurality of subscriber units 106–122 contend for reverse link channels, receive reservations for designated transmissions on the reverse link channels, transmit upon the reverse link channels and operate to perform reverse link power control upon the reverse link all according to the present invention. The CDMA cellular system infrastructure shown includes a base station 102 and a network infrastructure 104. These components will be discussed in more detail with reference to FIG. 2 and additional network infrastructure 104 components will be introduced. However, these components are generally known and will be described only as they relate to the teachings of the present invention. The CDMA cellular system 100 may operate according to any various industry standard protocol (or proprietary protocol) that has been modified in accordance with the teachings of the present invention.

The base station 102 provides wireless service within a corresponding geographic area (e.g., cell or sector(s)). The subscriber units 106–122 establish respective wireless links with the base station 102 and, once established, pass voice communications and data communications across the wireless links. As will be discussed further with reference to FIG. 3, the base station 102 and the subscriber units 106–122 support various forward link and reverse link channels. While some of the channels are tailored for substantially constant bandwidth voice communications, other of the channels are tailored to "bursty" data communications.

Thus, some of the subscriber units (e.g., voice terminals 118, 120 and 122) require primarily voice communication services. Alternatively, other of the subscriber units (e.g., desktop computer 106, laptop computer 108, wearable computer 110, data terminal 112, vending machine 114 and credit card terminal 116) require primarily data communication services.

In servicing voice communications, the base station 102 and a subscriber unit (e.g., voice terminal 118) interact to setup a traffic channel (TCH). The TCH includes a forward link (F-TCH) from the base station 102 to the voice terminal 118 and a reverse link (R-TCH) from the voice terminal 118 to the base station 102. Communications on the F-TCH are encoded with a long Walsh code assigned to the voice terminal 118 and spread with a PN sequence. This encoding and spreading allows the voice terminal 118 to decode the F-TCH communications. R-TCH transmissions may also be encoded with a long Walsh code unique to the voice terminal 118. However, R-TCH transmissions are not always encoded in such a fashion.

In servicing data communications, the base station 102 may initially setup and service a TCH so that a logical connection may be established between a subscriber unit, e.g., data terminal 112, and another digital computer. After a period of inactivity on the TCH, however, the TCH may then be released. Subsequent bursty data communications are then serviced on a reverse contention-based channel such as a Reverse Access Channel (R-ACH) or a Reverse Common Control Channel (R-CCCH). The R-ACH and the R-CCH are channels for which the subscriber units contend. There may exist multiple R-ACH and R-CCH channels with each distinguished by a unique PN spreading code. In combination, these channels are referred to as Reverse Contention Based Channels (R-CBCHs). The R-CBCHs may be used to transmit messages and/or data from a subscriber unit to the base station 102. Of course, the definition of the R-CBCH includes channels other than that R-CCCH and the R-ACH that operate according to the present invention.

Slots of the R-CBCH include a preamble, a message capsule and an idle period. The size of the preamble and message capsule vary for differing channel structures and implementations. However, in one embodiment, the preamble occupies 3 to 4 frames while the message capsule occupies 4 to 10 frames. In initiating contention-based transmissions on the R-CBCH, a subscriber unit synchronizes to a pilot signal (broadcast from the base station) and then transmits upon the R-CBCH. The transmission is successful if the base station 102 is able to decode the transmission. Upon a successful transmission, the base station 102 sends a confirmation of receipt to the transmitting subscriber unit, e.g., data terminal 112, on a Forward Common Control Channel (F-CCCH). Transmissions may be unsuccessful if collisions occur or if the base station 102 does not receive the transmission at a sufficient power level.

According to the present invention, a subscriber unit, e.g., data terminal 112, may reserve a R-CBCH for designated mode data bursts. When transmitting on a given R-CBCH in this manner (i.e., by reservation and/or designation), contention is avoided for that specific R-CBCH channel. In reserving an R-CBCH, the data terminal 112 transmits a designated mode reservation request message to the base station 102 on the R-CBCH. If the reservation request message is successfully received by the base station 102, the base station may assign one or more slots to the data terminal 112 for a designated mode data burst. In such case, the base station 102 sends a designated mode assignment message to the data terminal 112. The data terminal 112 then waits for the assigned time slot and begins transmission of the data burst on the R-CBCH. The data terminal 112 continue its data burst transmission on the R-CBCH during the designed mode assignment period. Once the designated mode assignment period expires, contention based transmission operation continues. However, the data terminal 112 may make further requests for designated mode assignments.

The base station 102 may also initiate designated mode operations. In an example of such an operation, the base station 102 desires particular information from credit card machine 116. Previously, the credit card machine 116 established a data link on the TCH with a remote computer during which time validation was performed. After a period of inactivity, the TCH was released. However, the credit card machine 116 had additional data to collect and transmit. Because the base station 102 is aware of this additional data transmission requirement, it will subsequently receive this data in a designated mode data burst. When the time comes for the data to be received, the base station 102 sends a designated mode assignment message on the F-CCCH to the credit card machine 116. The credit card machine 116, based upon the message, responds in a designated mode data burst with the data it has collect. The data is then relayed to the remote computer.

According to another aspect of the present, closed loop power control is performed during transmissions from a subscriber unit to the base station 102 on the R-CBCH. Such power control may be performed not only during designated mode data bursts on the R-CBCH but during contention based reverse mode transmissions on the R-CBCH as well. Closed loop power control on the R-CBCH increases the success rate for R-CBCH transmissions by causing the transmissions to arrive at the base station 102 at a desired signal-to-noise ratio (SNR).

According to still another aspect of the present invention, a channel is defined that carries power control bits for at least one R-CBCH. This channel may further carry information regarding designated mode data burst assignments on the R-CBCH. The structure of this channel will be further described with reference to FIG. 4.

Figure 2:
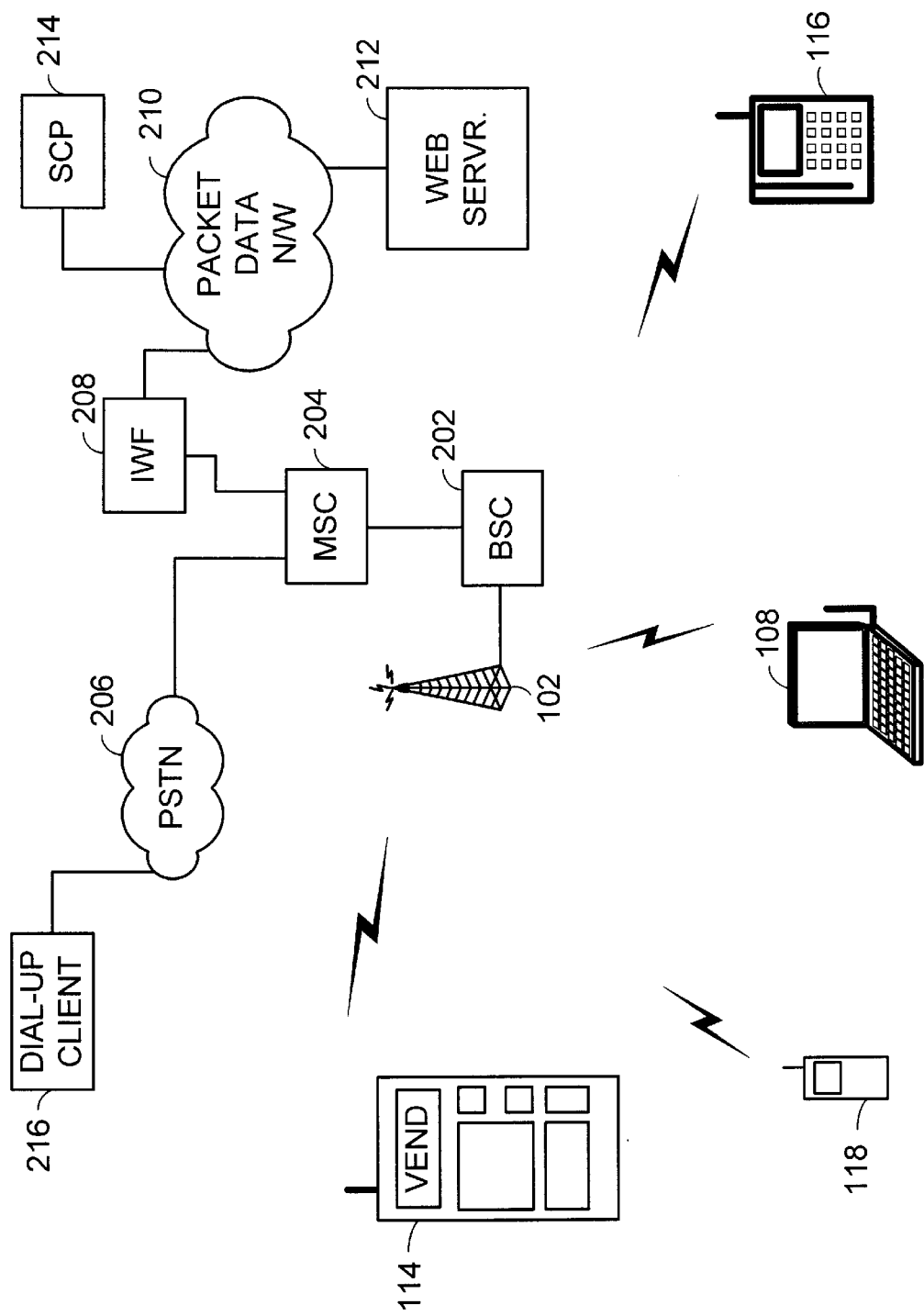
FIG. 2 is a system diagram illustrating in more detail the structure of a CDMA cellular system constructed according to the present invention and its interconnection with the Public Switched Telephone Network and a packet data network, in combination, these components servicing data sessions.

FIG. 2 is a system diagram illustrating in more detail the structure of a CDMA cellular system constructed according to the present invention and its interconnection with the Public Switched Telephone Network (PSTN) 206 and a packet data network 210. In combination, the components illustrated service data sessions. In a typical CDMA system (or other cellular system), the base station couples to a Base Station Controller (BSC) 202. Other base stations (not shown) also couple to the BSC 202. The BSC 202 (and other BSCs not shown in FIG. 2) couple to a Mobile Switching Center (MSC) 204. The MSC 204, in turn, couples to the PSTN 206 and to a packet data network 210 (e.g., the Internet) via an Interworking Function (IWF) 208.

Communications routed across the PSTN 206 are typically voice communications while communications routed across the packet data network 210 are typically data communications. However, the PSTN 206 may also service data communications (e.g., circuit data such as video) while the packet data network 210 may also service voice communications (e.g., Voice over Internet Protocol communications). Data communications are serviced between the coupled wireless subscriber units, 108, 114, 116 and 118 and various digital devices coupled to the PSTN 206 and the packet data network 210. These digital devices include, for example, a dial-up client computer 216 coupled to the PSTN 206, a web server 212 coupled to the packet data network 212 and a Service Control Point (SCP) 214 coupled to the packet data network 210. As is generally known, a wide variety of services may be provided to the wireless subscriber units 108, 114, 116 and 118 via connections with these digital devices. These services will not be described herein except to expand upon the teachings of the present invention.

As is generally known, data communications are serviced between digital computers as contrasted to voice communications, which are serviced between human users. These digital computers are operated by humans in some implementations but are stand-alone devices in other implementations. For example, a human user typically operates a laptop computer 108 and provides significant intervention during some tasks like web browsing but provides little intervention during other tasks like file transfers. As another example, a credit card machine 116 requires little human interaction in performing its functions. Further, a vending machine 114, in reporting its status to a remote computer, e.g., dial up client 216, requires no human intervention once it is programmed.

When human intervention/interaction is required, the human user expects a particular response period. Thus, communications of this type are generally serviced upon request. In the case of a laptop computer 108 user establishing a web session with web server 212, the human user requires at least a minimum response rate. Thus, data communication services between the base station 102 and the laptop computer 108 must be provided at a minimum data rate. In such case, to provide the minimum data rate, a TCH is setup between the laptop computer 108 and the base station and the data communications are serviced on the TCH. However, when the data communications between the laptop computer and the web server 212 become idle for a period of time, the TCH may be released. Then, when the data communication requirements continue, the TCH is reassigned to service the data communications. Thus, the TCH is setup, released and setup again, as data communications require.

Unfortunately, setup of the traffic channel consumes upward of 30 frames of communications between the base station 102 and the laptop computer 108. Thus, according to the present invention, the R-CBCH is used for reverse link data communications. These data communications may be transmitted from the laptop computer 108 in a contention based mode, in a designated mode data burst initiated by the base station 102 or in a designated mode data burst initiated by the laptop computer 108. Thus, when a TCH is not required for the reverse link transmission bandwidth requirements, setup and use of the TCH is avoided in favor of using the R-CBCH.

In an example of operation according to the present invention, the credit card machine 116 is used to validate/receive a credit card transaction. Because no land-line is available (or because of the cost associated with the land-line), the credit card machine 116 employs a wireless link to the base station 102 to form a communication path to the SCP 124. The SCP 124 supports credit card validation/ transaction services. The data requirements of the data communications for the transaction may require an initial assignment of a TCH so that the SCP 124 and credit card machine 116 may initialize the transaction. Once these initial data communications are completed, the SCP 214 must validate the credit card and the credit card machine 116 must gather additional information regarding the current transaction. Therefore, because data transmission requirements are reduced, the credit card machine 116 and SCP 214 operate in conjunction with the base station 102 to release the TCH. Then, after a given time period, the SCP 214 requests the additional information from the credit card machine 116.

Because the base station 102 has particular knowledge with respect to the size of this data communication, it requests that the credit card machine 116 respond in a designated mode data burst. The base station 102 therefore sends a designated mode assignment message to the credit card machine 116. In response, the credit card machine 116 transmits its collected data in a designated burst mode on the R-CBCH to the base station 102. The base station 102 then relays the data to the SCP 214.

In still another operation according to the present invention, a vending machine 114 performs a periodic (e.g., daily) notification of its status to a SCP 214. However, this transaction is asynchronous and does not have to be setup between the SCP 214 and the vending machine 114. Thus, at a determined time, the vending machine 114 initiates a communication to the SCP 214 across a wireless link to the base station 102. If the data to an be contained in a single slot, the vending machine 114 performs a contention based data transmission on the R-CBCH. However, if the data to be sent will consume multiple slots, the vending machine 114 sends a designated mode reservation request to the base station 102 on the R-CBCH. In response, the base station 102 initiates a designated mode assignment and notifies the vending machine 114 of such assignment. Then, the vending machine transmits its data to the base station 102 in a designated mode data burst during the assigned time period. In either case, the base station 102 receives the data transmission and forwards the data transmission to the SCP 214.

Figure 3:
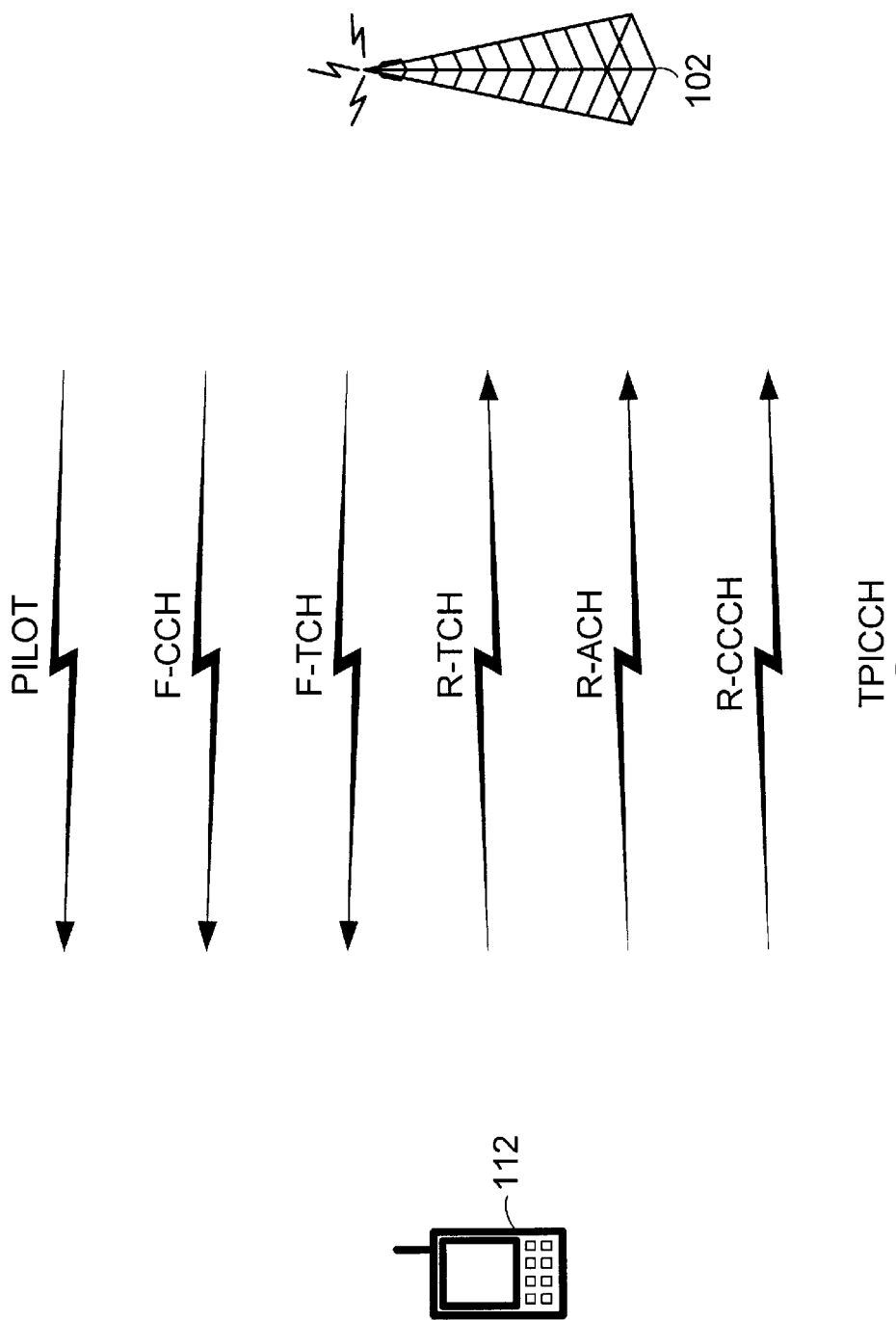
FIG. 3 is a system diagram illustrating a subscriber unit and a base station constructed according to the present invention and a plurality of channels upon which the subscriber unit and base station communicate.

FIG. 3 is a system diagram illustrating a subscriber unit 112 and a base station 102 constructed according to the present invention and a plurality of channels upon which the subscriber unit and base station communicate. A pilot signal is transmitted from the base station 102 and received by all subscriber units (including data terminal 112) operating in a supported geographic area (e.g., cell or sector(s)). Data contained in the pilot signal is used in determining communication parameters to be used with the base station 102, in synchronizing receipt of transmissions from the base station 102, in synchronizing transmissions to the base station, and in performing open-loop reverse link power control calculations.

The Forward Control Channel (F-CCH) is used by the base station 102 to send control messages and other information to the subscriber units. An example of such a control message is a traffic channel assignment. A F-TCH and a R-TCH are the two components (i.e., forward link and reverse link, respectively) of a TCH, which are setup and serviced to and from the base station 102 and a subscriber unit. The R-ACH and the R-CCCH are examples of R-CBCHs that may operate according to the present invention to service reverse link control messages and data transmissions. The R-ACH and the R-CCCH may both be operated according to the present invention to support designated mode data bursts from the subscriber unit 112 to the base station 102. While only a single R-ACH and a single R-CCCH are illustrated, the base station 102 may support multiple R-ACHs and multiple R-CCCHs.

Further illustrated is a Transmit Power Control and ISMA Control Channel (TPICCH) constructed according to the present invention. The TPICCH provides reverse link power control information to subscriber units transmitting on a R-CBCH. Such transmissions could be contention based or designated mode data burst based. In either case, the reverse link power control information allows the subscriber unit(s) to perform closed loop power control operations on the R-CBCH during transmissions. The TPICCH further provides ISMA information corresponding to the R-CBCH channel(s) supported by the base station 102. For designated mode data bursts, this ISMA information assigns a particular R-CBCH to a particular subscriber unit for one or more scheduled slots. Upon receipt of this ISMA information, a receiving subscriber unit will determine when it may transmit on the assigned R-CBCH and for what duration.

Figure 4:
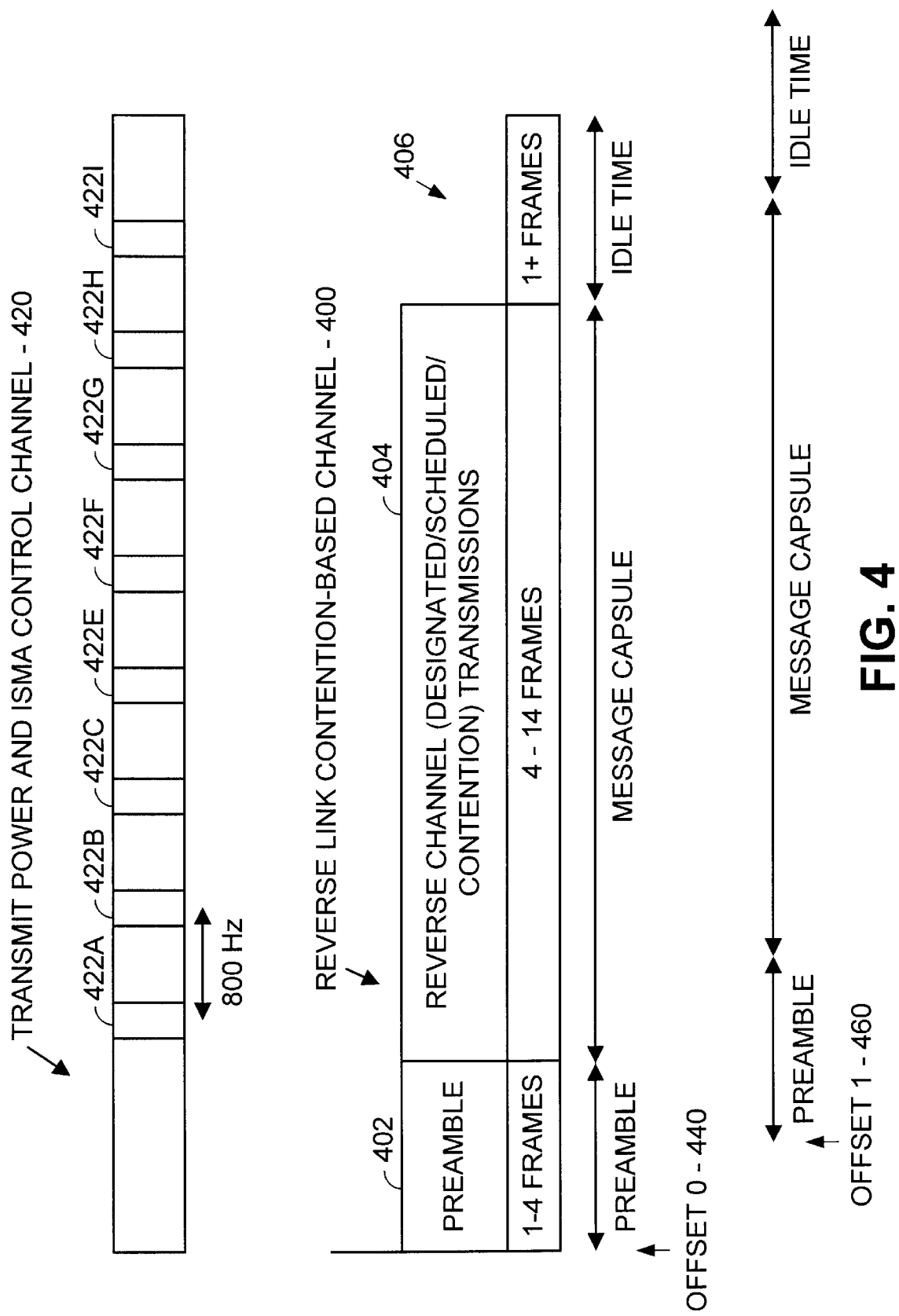
FIG. 4 is a block diagram illustrating the structure of a reverse link contention based channel and a transmit power and inhibit sense multiple access channel, both of which are operated according to the present invention.

FIG. 4 is a block diagram illustrating the structure of a reverse link contention based channel (R-CBCH) 400 and a transmit power control and inhibit sense multiple access control channel (TPICCH), both of which are operated according to the present invention. The R-CBCH 400 includes a preamble 402, a message capsule 404 and an idle time 406, these components repeated for each slot in the R-CBCH 400. The preamble 402, for example, consumes from between 1 and 4 frames of the slot and allows the base station 102 to identify the transmission. The message capsule 404, for example, consumes from 4 to 14 frames of the slot and may include a message and/or data. The idle time 402 consumes the remaining portion of the R-CBCH 400 slot. Of course, the number of frames contained in each slot and the number of frames consumed by each of R-CBCH component may vary from R-CBCH to R-CBCH, depending upon the particular embodiment and may vary without departing from the scope of the present invention.

Transmission of the R-CBCH 400 slot is substantially synchronized to the forward link pilot (or other timing signal). The accuracy of the synchronized transmission, however, is limited by multi-path fading, transmission delays and other timing based concerns. Multiple R-CBCHs may be transmitted in a common frequency band, with the multiple R-CBCHs separated by a PN code, PN code offset and/or a Walsh code. In the example shown, the first R-CBCH 400 is aligned with a 0-offset (within the accuracy possible considering the aforementioned inaccuracies) while a second R-CBCH is aligned with a 1-offset. In this example an offset of 1 is symbolic and may correspond to several PN chips.

The TPICCH 420 includes power control information and ISMA information corresponding to at least one R-CBCH supported by the base station 102. Subscriber units transmitting on the R-CBCH use the power control information for closed loop power control. Listening subscriber units use the ISMA information to determine whether a corresponding R-CBCH has been reserved for a data burst. Thus, the bits transmitted by the base station 102 on the TPICCH 420 (i.e., power control and ISMA bits) direct subscriber units to increase/decrease reverse link transmit power levels during reverse link transmissions. Furthermore, the presence of these bits also indicates that the associated R-CBCH is in use, while the absence of these bits indicates that the associated R-CBCH is idle. Therefore, the bits transmitted on the TPICCH serve as both power control and inhibit indicators. That is, the presence of the power control bits indicates that other mobiles should not transmit (i.e., should inhibit) their transmissions on the associated R-CBCH.

While FIG. 4 illustrates one stream of TPICCH bits, many streams of power control bits may be transmitted on the TPICCH, each stream offset from each other stream. Furthermore many TPICCHs may be transmitted. Each power control bit stream may be associated with a particular R-CBCH with the mapping of power control and ISMA bits on the particular TPICCH bit stream mapped to a specific R-CBCH. Thus, there is a one to one correspondence between the TPICCH bits and R-CBCH. Such mapping will be discussed in more detail with reference to FIGS. 9, 10 and 11.

During the message capsule, the TPICCH 420 bit stream indicates up/down power control bits to the respective R-CBCH users. Mobile stations monitor the TPICCH bits corresponding to a given R-CBCH in order to detect an "idle" period following the end of transmission on the R-CBCH. The idle period is thus defined as an absence of bits on the TPICCH 420 (corresponding to the specific R-CBCH). Once the idle period is detected, the mobile stations may contend for the R-CBCH channel on the next slot. After the next slot, however, mobiles may not contend for the channel until after the next idle period. If a mobile station detects the presence of ISMA bits 406 corresponding to a given R-CBCH offset, then it is inhibited from transmitting during the next slot on the corresponding R-CBCH. In short, during the message capsule 404, each component of the bit stream associates with a given access channel offset. The bit stream simultaneously provides power control bits 422A–422H and ISMA bits.

Power control performance is very sensitive to the delay from the time that the base station issues a power control command to the time the power control command is executed by the mobile station. Each power control command is interpreted individually and, if a power control command is received in error (i.e., due to fading and noise in the channel), then the power control is corrected during subsequent power control commands and not the current power control command. Thus, the reverse link power control closed loop is tolerant of a modest power control command error rate (e.g., ~4%).

In contrast, an error in reception of ISMA bits has a much different affect on performance. For example, false detection of ISMA bits during the idle period 406 will cause under utilization of the access channel. Missed detection of ISMA bits will result in a collision. Consequently, it is suggested that a simple forward error control block code may be employed for protection of the ISMA bits.

The error control block code may take the form of a repetition code. In such a case, more than one ISMA bit is transmitted during the idle period. Redundancy in transmission of this type provides some performance improvement due to time diversity. Alternatively, the ISMA bits might consist of one bit (or possibly repeated ISMA busy indications) followed by some parity bits.

For example, in one mode of operation, after a block code is decoded, the presence of the ISMA bits may be estimated by the output of the block decoder. For simplicity, this estimate may be normalized, where a 1 indicates presence of the ISMA bits and a 0 indicates that ISMA bits are not present. The decoder may output hard decisions (i.e., either a 1 or a 0) or a soft value (i.e., some quantized value between 1 and 0). A soft decision output allows at least two thresholds—a Zero Threshold, and One Threshold to be defined. The Zero Threshold is a soft value above zero and below the One Threshold. In a statistical sense, if given that the ISMA bits are not present, and the soft estimate is below the Zero threshold, then the decision is 0. Given that the ISMA bits are present, if the soft estimate is above the One Threshold then the decision is 1. An uncertainty region effectively lies between the Zero Threshold and One Threshold. Thus if the soft decision lies within the uncertainty reason, some resolution of this uncertainty can favor either 1 or 0. When the 1 decision is favored, then the decision favors avoiding collisions at the risk of reduced throughput. Conversely, when the 0 decision is favored, a higher collision rate is favored in an attempt to increase throughput. Of course, other error control operations may also be employed.

Figure 5:
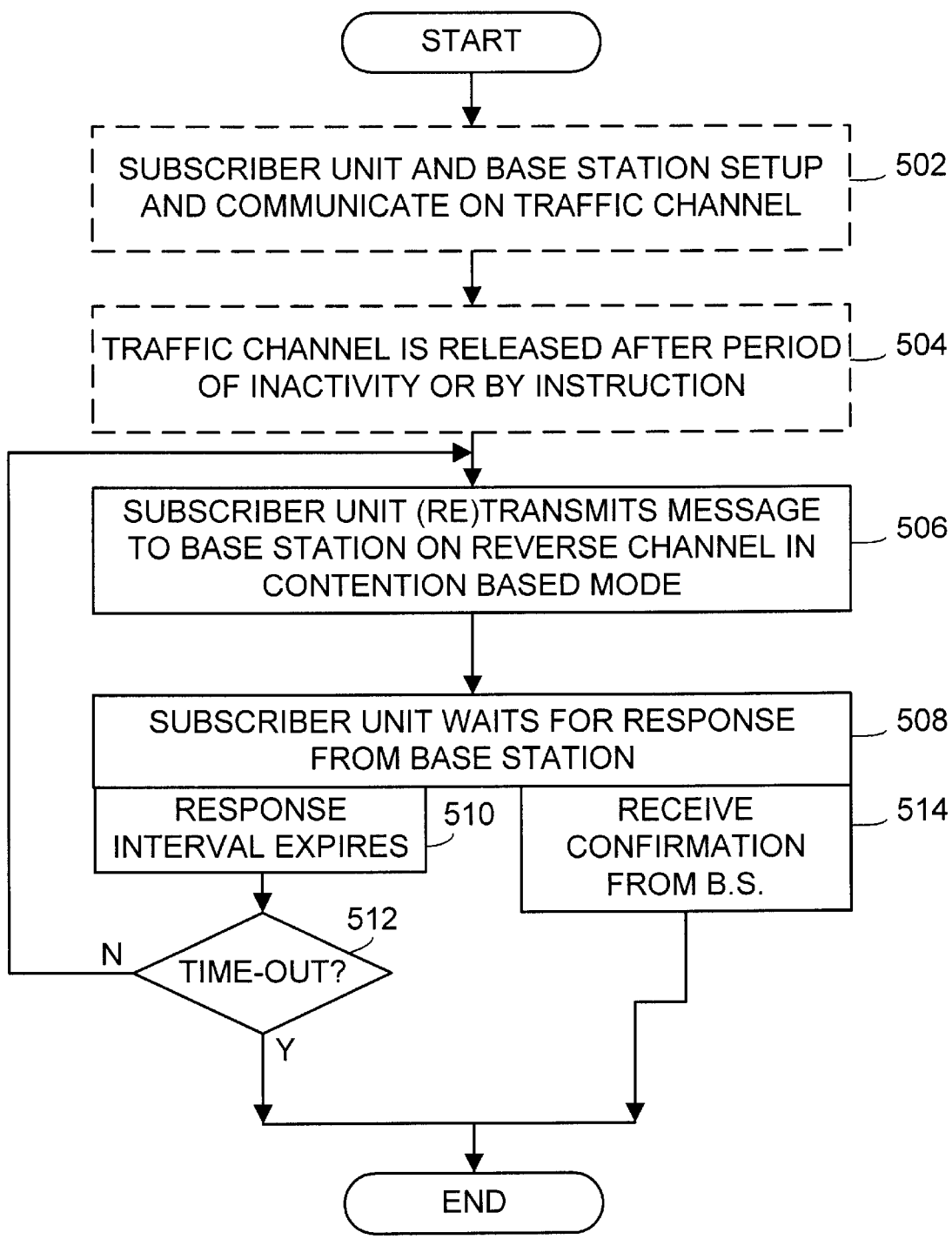
FIG. 5 is a logic diagram illustrating operation of a subscriber unit in communicating with a base station on a reverse link channel in a contention based mode.

FIG. 5 is a logic diagram illustrating operation of a subscriber unit in communicating with a base station on a reverse link channel in a contention-based mode. The reverse link channel is an R-CBCH that operates according to the present invention. Prior to operating on the R-CBCH, the subscriber unit and base station may setup and communicate on a traffic channel (step 502). The operations required to setup and operate a traffic channel are generally known. If the traffic channel is optionally setup, the traffic channel will be released after either a period of inactivity or by instruction (step 504). As has been previously described herein, data communications often are bursty transmissions that must be initially setup and then serviced according to actual data transmission requirements. Operation at differing protocol layers will be unaffected by whether the TCH or R-CBCH carries reverse link data communications. Thus, after setup of a traffic channel (step 502), the communication is logically complete and the traffic channel may be released (step 504) without release of the logical connection. Subsequent communications may therefore be serviced according to the steps 506–514. However, subsequent communications could also be serviced by additional TCH operation.

Based upon its reverse link communication requirements, the subscriber unit may transmit a message (or data) on the R-CBCH in a contention based mode (step 506). Transmissions in this contention based mode are made on the R-CBCH 400 illustrated in FIG. 4. Thus, the R-CBCH includes a preamble 402 and a message capsule 404. Further, the contention-based transmission on the R-CBCH 400 is synchronized to a pilot signal with an assigned offset (e.g., offset 0, offset 1, etc.). During the transmission on the R-CBCH 400, the subscriber unit (and the base station) may perform closed loop power control operations that are further described with reference to FIG. 8. Adjustments to the subscriber unit's transmit power will be made based upon power control bits contained on a forward link transmission (e.g., TPICCH).

After its contention based transmission on the R-CBCH, the subscriber unit waits for a response from the base station (step 508). If the response interval expires (step 510) to indicate that the base station did not receive the transmission, and a time-out has not occurred (step 512), the subscriber unit retransmits the message (or data) to the base station (step 508). However, if a response time-out has occurred or if the mobile station receives a confirmation from the base station of receipt of the message (or data), operation ends.

Figure 6:
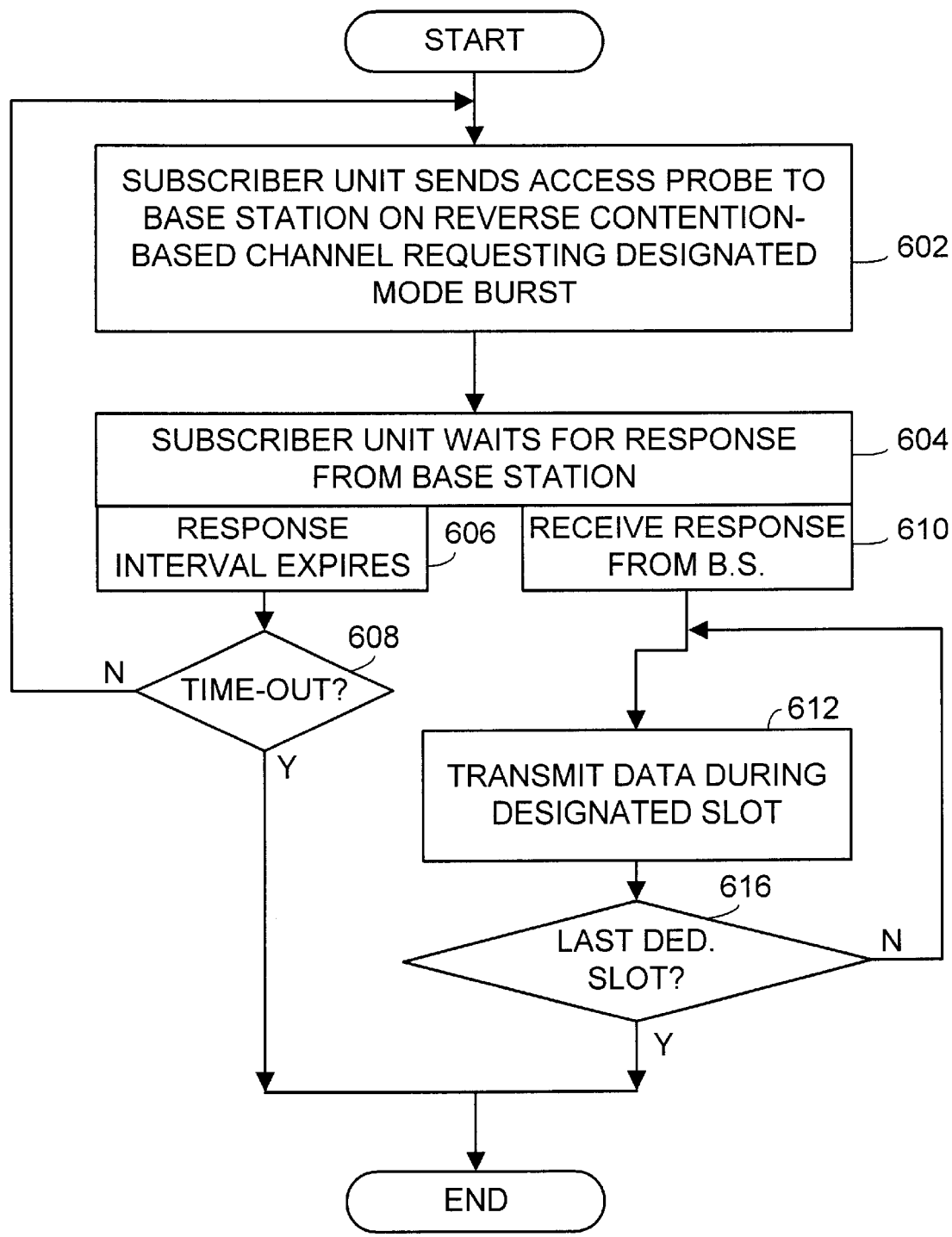
FIG. 6 is a logic diagram illustrating operation of a subscriber unit in initiating a designated burst mode transmission to a base station and operation during such designated burst mode.

FIG. 6 is a logic diagram illustrating operation of a subscriber unit in initiating a designated burst mode transmission to a base station and operation during such designated burst mode. As was previously described, a subscriber unit may request a designated burst mode transmission via the R-CBCH when the R-CBCH is available (i.e., not reserved for another subscriber unit). In such case, the subscriber unit sends an access probe to the base station on the R-CBCH requesting a designated burst mode (step 602). In its access probe, the subscriber unit may indicate the amount of data it has to transmit and may request a particular time for transmission. The access probe also includes an identification of the subscriber unit and may reference a logical connection that has been previously established.

Once the request is transmitted, the subscriber unit waits for a response from the base station regarding the request (step 604). Such response sent to the subscriber unit on the F-CCCH or another forward control channel. If a response interval expires without a response to the request (step 606) and a time-out interval has not expired (step 608), the subscriber unit sends another access probe requesting a designated burst mode. However, if the base station responds to the subscriber unit by assigning a designated burst mode to the subscriber unit (step 610), the subscriber unit decodes the response to determine when to initiate its burst mode transmissions on the R-CBCH. The subscriber unit then transmits its designated mode data burst during the designated slot (step 612). If the current designated slot was not the last slot designated (step 616), operation returns to step 612 wherein the subscriber unit waits for the next slot to commence and again transmits. However, if the current slot was the last designated slot (step 616) or if a time-out has occurred (step 608), operation ends. As was the case with FIG. 5, the transmission operations in FIG. 6 during the access probe (step 602) as well as during the designated burst mode (step 612) may include closed loop power control operations that will be further described with reference to FIG. 8.

Figure 7:
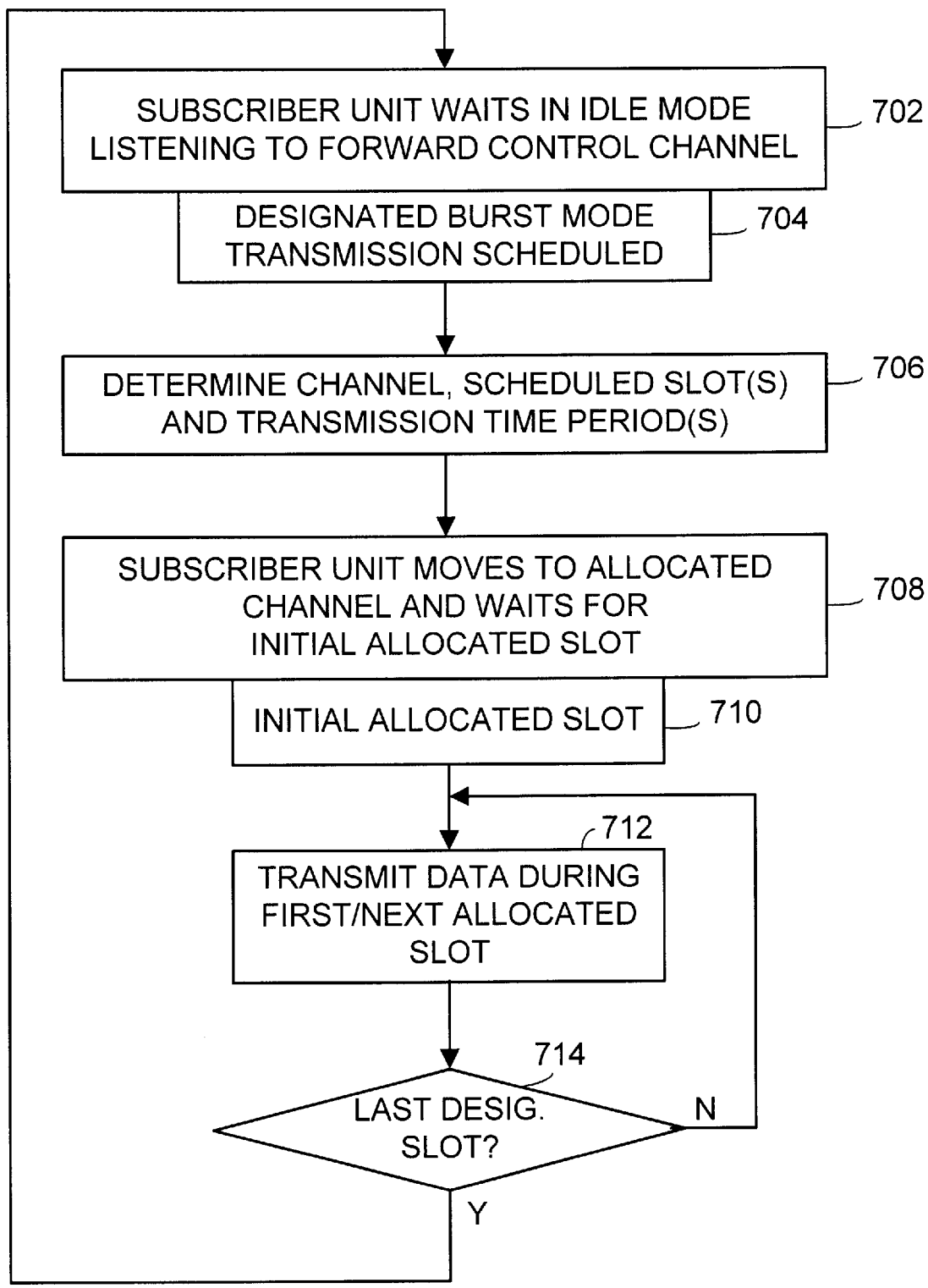
FIG. 7 is a logic diagram illustrating operation of a subscriber unit in transmitting data in a designated burst mode that was initiated by a base station.

FIG. 7 is a logic diagram illustrating operation of a subscriber unit in transmitting data in a designated burst mode that was initiated by a base station. As was previously described, three modes of reverse link transmissions on the R-CBCH are possible. The first mode of reverse link transmission is the contention-based transmission (described with reference to FIG. 5). The second mode is a designated mode transmission that is initiated by a subscriber unit (described with reference to FIG. 6). The third mode is a designated burst mode transmission that is initiated by the base station. All three modes may be scheduled to occur after a particular time period upon which both the base station and the subscriber unit agree.

Still referring to FIG. 7, in an idle state, the subscriber unit listens to forward link transmissions from the base station (step 702). These forward link transmissions may be received on the F-CCCH, the TPICCH or on another forward link channel. When a designated burst mode transmission is scheduled for the subscriber unit (step 704), the subscriber unit determines the R-CBCH, the designated slot(s) and the transmission time period(s) for the designated mode transmission based upon the contents of the forward link transmission.

Based upon its determination, the subscriber unit tunes to the allocated channel and waits for the initial allocated slot (step 708). When the initial allocated slot commences (step 710), the subscriber unit begins its designated burst mode transmission (step 712). Upon commencing its transmission, the subscriber unit determines whether the slot upon which the current transmission was made (step 714) was the last designated slot. If not, the subscriber unit transmits during the next allocated slot (step 714). If so, the subscriber unit returns to the idle state awaiting other transmissions on the forward control channel.

Figure 8:
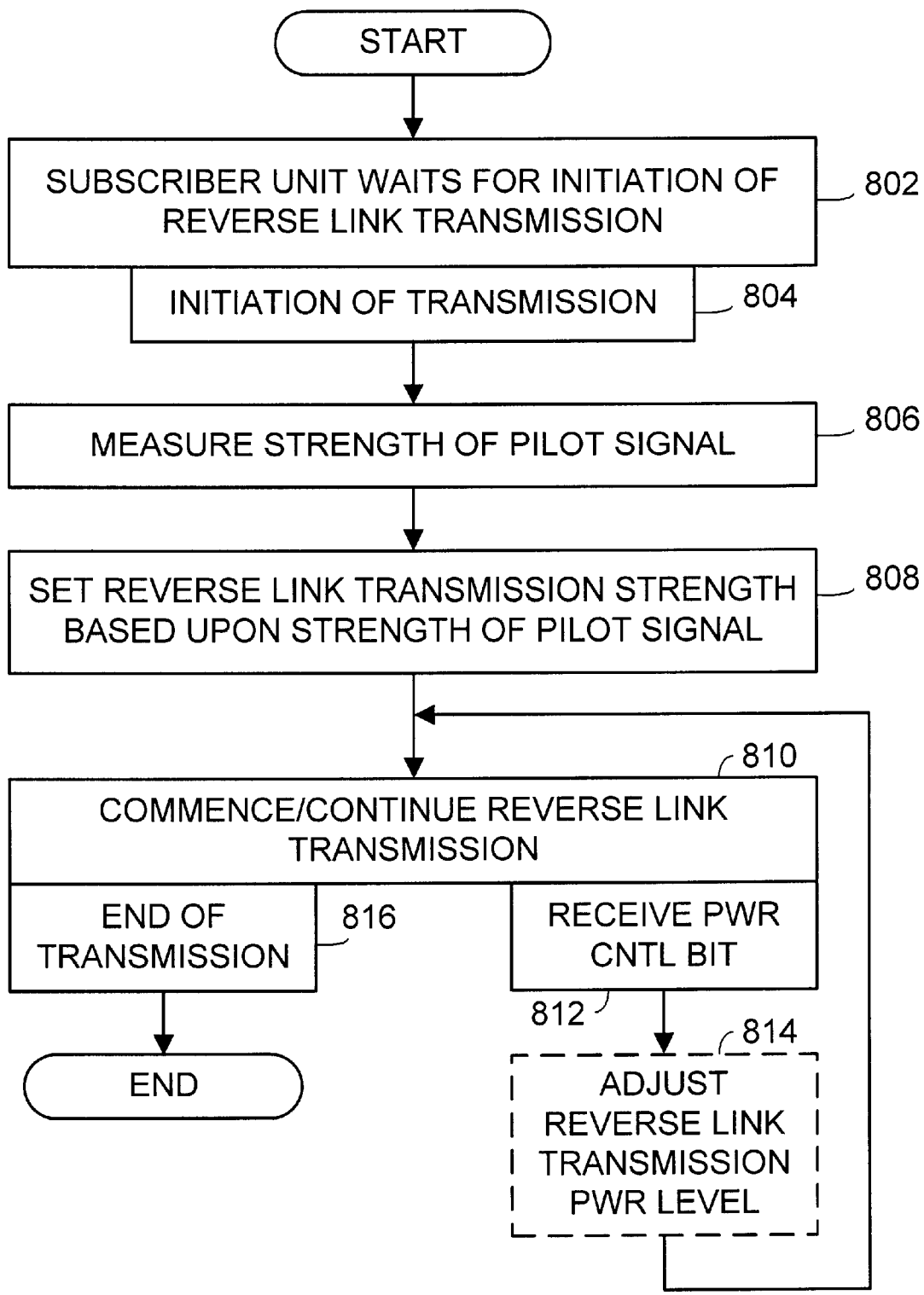
FIG. 8 is a logic diagram illustrating operation of a subscriber unit and a base station in performing power control during a reverse link burst mode transmission.

FIG. 8 is a logic diagram illustrating operation of a subscriber unit and a base station in performing power control during a reverse link burst mode transmission. When not transmitting on the R-CBCH, power control operations at the mobile station are idle and the subscriber unit waits for the initiation of a reverse link transmission (step 802). When a reverse link transmission is initiated (step 804) but prior to transmission on the R-CBCH, the subscriber unit measures the strength of a forward link pilot signal from the base station (step 806). Based upon the measured strength of the forward link pilot signal, the subscriber unit performs open loop power control by setting its reverse link transmission strength based upon the strength of the pilot signal step 808).

Once the open loop transmission strength has been determined, the subscriber unit commences its transmission on the R-CBCH (step 810). During the transmission, however, the subscriber unit receives one or more power control bits from the base station on a forward link channel, e.g., F-CCCH, TPICCH or another forward link channel (step 812). Based upon the state of the power control bits, the subscriber unit may adjust the power of its reverse link transmissions (step 814). With the transmission power adjusted, the subscriber unit continues transmitting on the R-CBCH (step 810) until the transmission ends (step 816), at which point, power control operations at the mobile also end.

Figure 9:
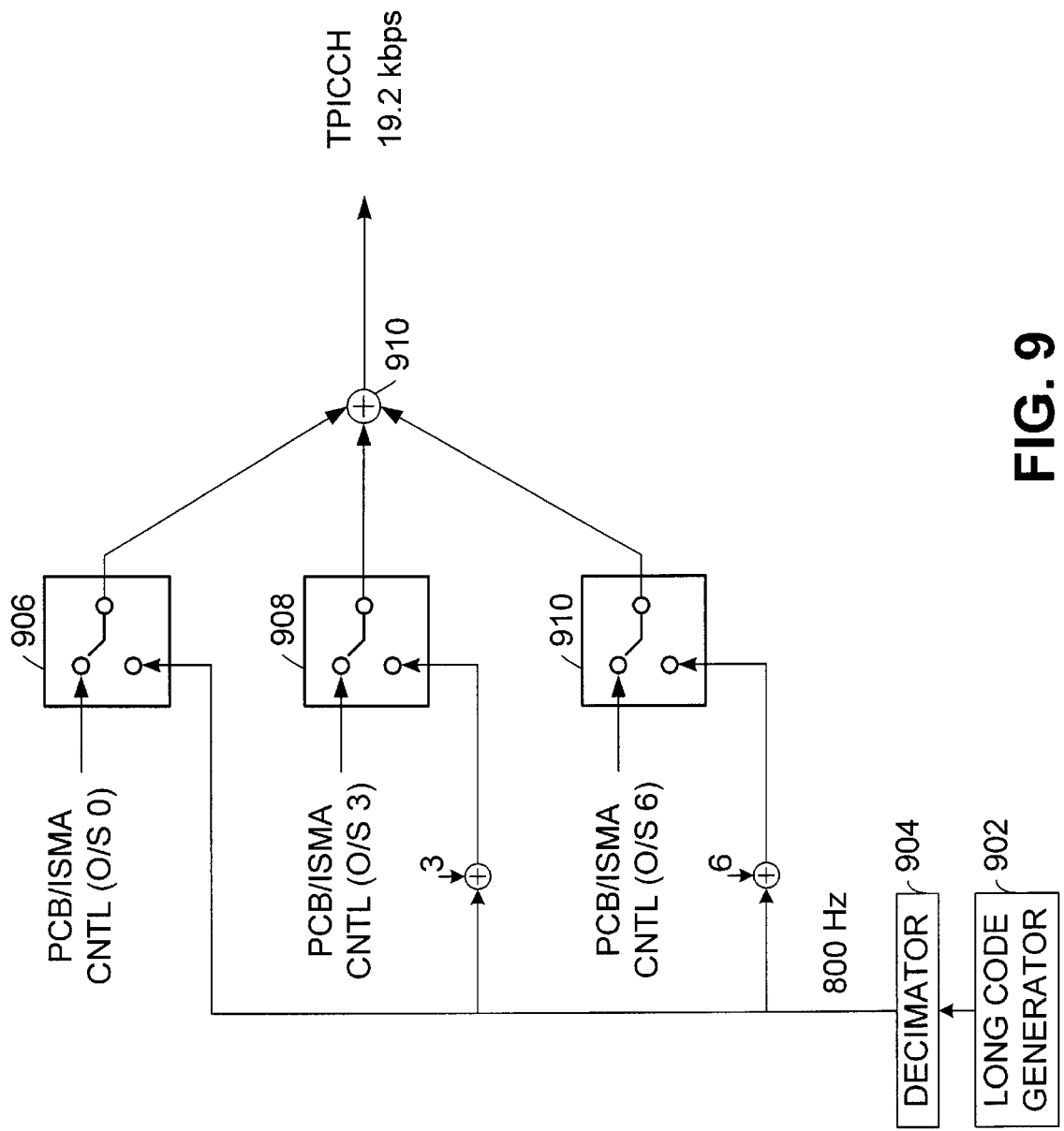
FIG. 9 is a block diagram illustrating the manner in which a base station couples a plurality of power control bits and a plurality of inhibit sense multiple access bits upon a single forward link channel.

FIG. 9 is a block diagram illustrating the manner in which a base station couples a plurality of power control bits and or a plurality of inhibit sense multiple access bits upon a single forward link channel. As was previously described, it is desirable to use a single forward link channel to transmit power control information and ISMA information for a plurality of R-CBCHs. In the structure of FIG. 9, three power control bit and ISMA bit streams are coupled onto a single forward link channel. This forward link channel will support from 0 to 16 of these bit streams at a TPICCH rate of 19.2 KBPS.

Each switch 906, 908 and 910 receives two inputs: (1) a decimated long code with the addition of an offset in time (in units of PN chip time), and (2) a power control and ISMA control bit stream. For example, assume that there are 24 bits in a power control group period (PCG). Then, the long code plus offset is taken modulo 16 (i.e., largest power of 2 equal to or smaller to 24). Each switch is closed during the period of time (i.e., or bits) during each PCG indicated by the decimated long code plus offset. Each power control and ISMA control bit stream is associated with a specific access channel and or corresponding access channel offset. This association can be established through overhead or system configuration messages sent to the subscriber unit. Alternately, the association may be sent as part of a message for the case of Designated/Scheduled mode operation.

The basic principle of operation for an individual power control and ISMA bit stream is similar to the placement of power control bits within a power control group (PCG) for an IS-95 forward traffic channel. However, the illustrated structure differs in that bits in the TPICCH are not punctured onto another channel and in that the TPICCH can support many power control and ISMA bit streams. For a 19.2 KBPS TPICCH rate there are 24 possible bit locations within the power control group. Sixteen of these locations are used for sending power control bits, where the location of each power control and ISMA bit within a PCG is indicated by the decimated long code state plus offset.

As shown, a long code generator 902 output is decimated by decimator 904 to provide an 800 Hz input that is combined with offsets, the combination of these signals indicating for which bits during the PCG that the switch is closed. Note that the offset shown in FIG. 9 for each switch is, in principle, a different and unique offset. These offsets are not necessarily the same offset by which R-CBCH channels are offset on the reverse link. The PCB/ISM bits input to each switch also enter at an 800 Hz rate and therefore the corresponding switch simply acts as a gate passing through the PCB/ISMA bit during the desired time. The offset added to the decimated long code is modulo 16 so that if the offset plus decimated long code exceeds 16 it wraps around through the beginning of the PCG. Thus, according to this technique, each power control and ISMA bit stream is placed pseudo randomly in the PCG and has a deterministic and unique offset with respect to other power control and ISMA bit streams.

Figure 10:
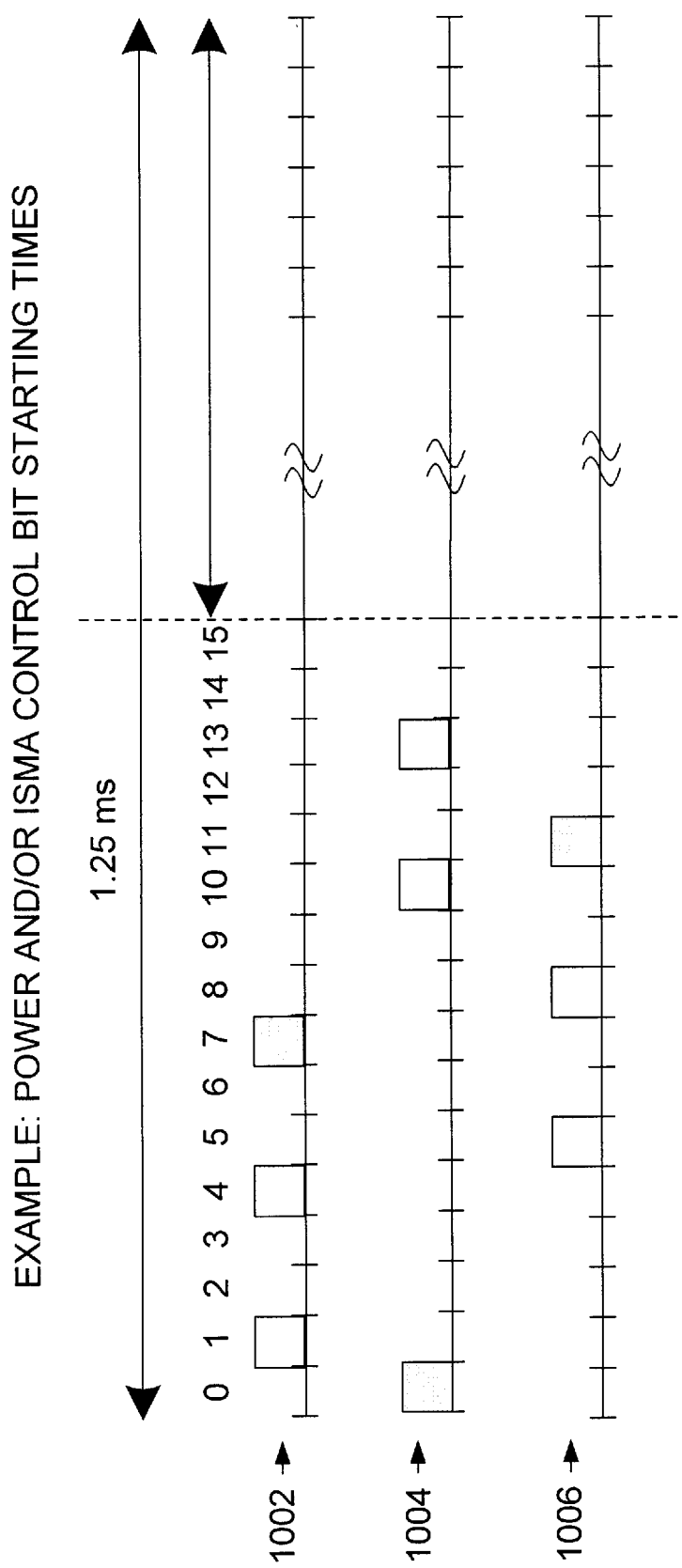
FIG. 10 is a block diagram illustrating the construction of a forward link channel serviced according to the present invention which provides a plurality of power control bits and or a plurality of inhibit sense multiple access bits to a plurality of subscriber units.

FIG. 10 is a block diagram illustrating the construction of a forward link channel serviced according to the present invention which provides a plurality of power control bits and a plurality of inhibit sense multiple access bits to a plurality of subscriber units. FIG. 9 shows three examples of power control bit positions which may occur, bit stream 1002, bit stream 1004 and bit stream 1006.

Bit stream 1002 has an offset of 0, bit stream 1004 has an offset of 3, and bit stream 1006 has an offset of 6. According to the example, the decimated long code state corresponding to time slot 1 operates so that the bit positions for the bit streams with offsets of 3 and 6 occur at PCG locations 4 and 7, respectively. Bit stream 1004 has a decimated long code state corresponding to 10 so that the offsets are at bit positions 13 and 0, respectively, because of wrapping. Bit stream 1006 is similar to bit stream 1002, but with a decimated long code state corresponding to 5.

The structure of FIG. 9 and the operations of FIG. 10 can accommodate other bit rates with simple modifications. For example, at a 38.4 KBPS rate the TPICCH could support at least 0 to 32 such bit streams. Alternatively, 16 bits could be transmitted such that they utilize the entire PCG (i.e., 12.8 KBPS rate, increasing the period of each bit), which would effectively increase the reliability of the power control and ISMA bits for the same transmitted amplitude level. Another possibility is to utilize all 24 bit locations in the PCG.

Figure 11:
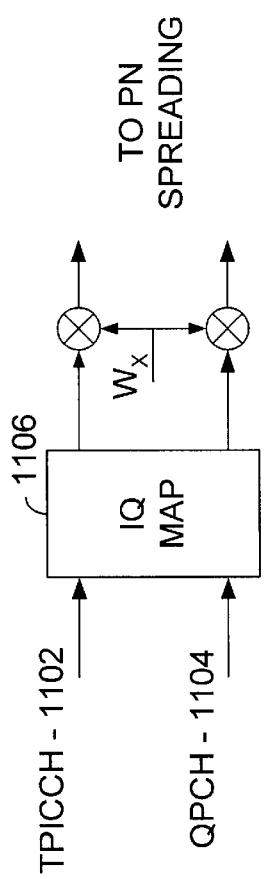
FIG. 11 is a block diagram illustrating the manner in which a base station may couple a forward link power control and an inhibit sense multiple access channel to another forward link channel using IQ mapping.

FIG. 11 is a block diagram illustrating the manner in which a base station may couple a forward link power control and an inhibit sense multiple access channel to another forward link channel using IQ mapping. As shown, for example, the TPICCH 1102 and the QPCH may be combined onto a single Walsh channel by mapping the TPICCH to the I (in-phase) and QPCH to the Q (quadrature) portion of a Walsh channel using an IQ map 1106. Of course, the converse mapping of these channels is also possible. Alternatively, the TPICCH channel may be mapped to I and Q or two TPICCH channels may be mapped to I and Q.

With a 19.2 KBPS rate on the TPICCH and QPCH this would require a Walsh code length of 64. The Walsh code length, however, can be chosen to match the rate of the TPICCH and QPCH to the desired chip rate. If the TPICCH and QPCH have different data rates, symbol repetition can be employed to match the rates of the channels before Walsh coding. Furthermore, if the TPICCH channel is not transmitted, then an additional QPCH channel can be transmitted on the I (in-phase) part of the Walsh channel. In principle, a given Walsh channel may carry one QPCH, a TPICCH and QPCH, or two QPCH's. A single QPCH can be mapped to I and Q (i.e., QPSK) and a Walsh code length 2 times the length with respect BPSK (i.e., mapping to only the I or Q channel) can be accommodated.

Figure 12:
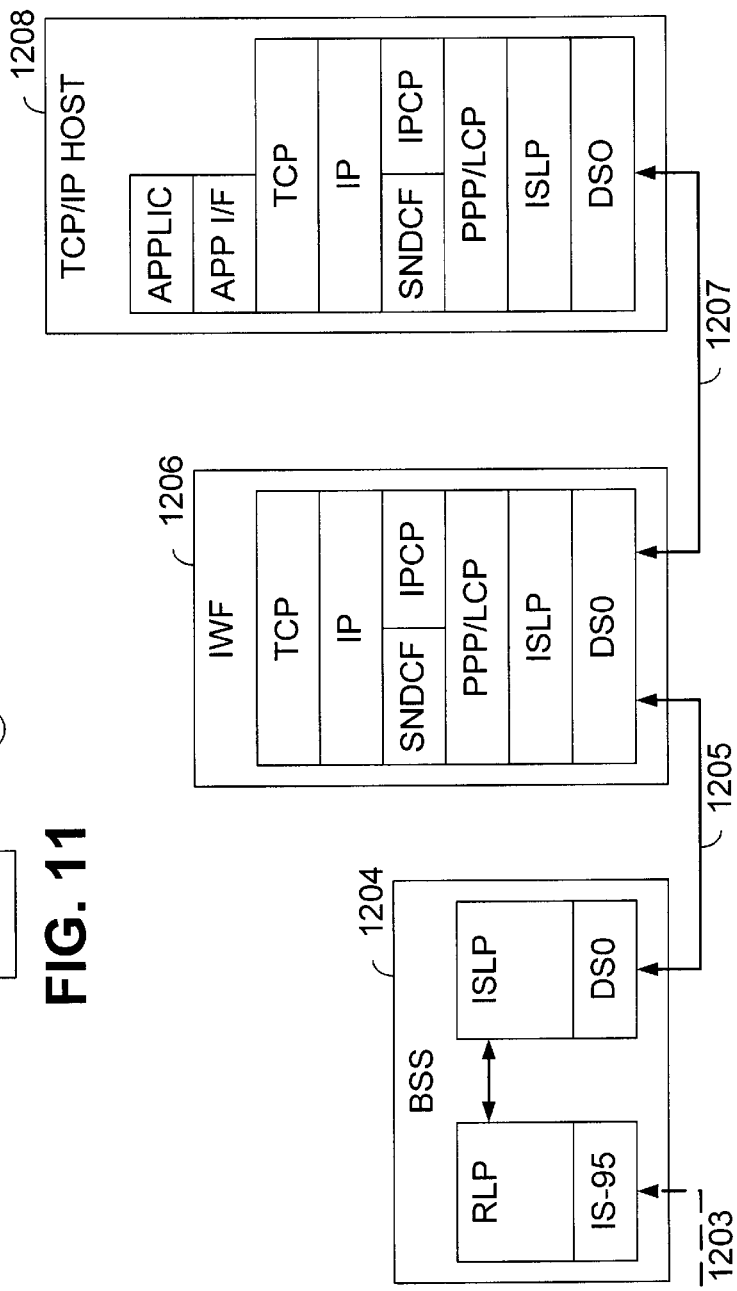
FIG. 12 is a block diagram illustrating how operation according to the present invention is incorporated into standardized data session operations.
Figure 12:
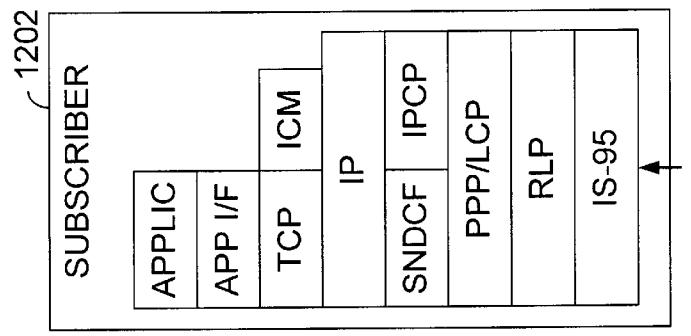

FIG. 12 is a block diagram illustrating the protocol stack components of a configuration of a CDMA wireless communication system constructed according to the present invention. Illustrated in FIG. 12 are the various Industry Standard Organization (ISO) protocol layers supported by each of the components of the CDMA wireless communication system. These protocol layers are employed to service data communications within the wireless communication system. As is generally known, the various protocol layers provide portability for applications between compliant systems and between applications of differing vendors. In the present example, application programs active on a subscriber unit 1202 (e.g., laptop computer 108 of FIG. 2) and a TCP/IP host 1208 (e.g., web server 212 of FIG. 2) operate in conjunction with one another.

Subscriber unit 1202 supports a full protocol stack. At the lowest level of the protocol stack of the subscriber unit 1202 is the IS-95 physical layer which manages the wireless link 1203 between the subscriber unit 1202 and the Base Station Subsystem 1204 (Base Station and MSC). Riding upon the IS-95 physical layer is the Radio Link Protocol (RLP). The RLP is a pure no-acknowledgement (NAK) based protocol that effectively reduces the Frame Error Rate (FER) produced by the wireless link 1203 between the subscriber unit 1202 and the base station/BTS (BSS) 1204 by requesting retransmission of frames when required. When the RLP at the subscriber unit 1202 (receiving end) detects a frame in error or a lost frame (e.g., data sent from a subscriber unit to the base station or vice versa), it sends back a NAK requesting retransmission of the frame. A timer is set for the missing frame. When the timer expires for the first attempt, the timer is reset and two NAKs are sent if the timer expires again, three NAKs are sent. Each NAK triggers exactly one retransmission of the erroneous or lost frame. Such operation tends to cause desired transmissions to be successfully sent across the wireless link 1203.

A Point to Point Protocol (PPP)/Link Control Protocol (LCP) layer rides above the RLP in the subscriber unit 1202. Above the PPP/LCP layer rides a Subnetwork Dependent Convergent Function (SNDCF) layer, which allows the data communication to be compliant with an X.25 gateway/router. Also riding above the PPP/LCP layer is an Internet Protocol Control Protocol (IPCP) layer, which provides the control protocol for an Internet Protocol (IP) layer riding above it.

Riding above the IP layer are the Transmission Control Protocol (TCP) and Internet Control Message Protocol (ICMP) layers. TCP provides reliable transport service and is an Acknowledge (ACK) based sliding window protocol. The ICMP layer is the layer that the IP layer uses to report errors and exceptions and may also include informational messages. An Application Interface (APP I/F) layer rides above the TCP and provides an interface between the TCP layer and the Application program being run.

The BSS 1204 supports a reduced protocol stack that supports the IS-95 physical link to the subscriber unit 1204 and the RLP layer. The BSS 1204 also supports a DS0 physical link which is a framing specification for digital signals in the North American digital transmission hierarchy at the zeroth DS level. A DS0 signal has a transmission rate of 64 kilobits per second. Alternately, the DS0 layer could be replaced with various other wired communication protocol physical layers. Riding above the DS0 layer is the InterSystem Link Protocol (ISLP) layer for Data Services. The data communications are passed between the RLP layer and the ISLP layer within the BSS 1204 during ongoing communications.

The IWF 1206 is employed in the present example to support IP data communications passing over the PSTN. It communicates with the BSS 1204 via a physical link 1205 (the physical link 1205 may a wired link, a microwave link, a fiber optic link or another link, or combination of links, that conforms to the DS0 layer standards). The IWF 1206 supports the DS0 physical layer. Above the DS0 physical layer resides the ISLP layer, the PPP/LCP layer, the SNDCF and IPCP layer, the IP layer and the TCP layer. Note that the application program and APP I/F are not run on the IWF 1206. However, since the IWF 1206 includes the TCP layer, it may perform data communication management at the TCP layer level.

The IWF 1206 communicates with the TCP/IP host via physical link 1207 which may be the physical link 1205 may a wired link, a microwave link, a fiber optic link or another link, or combination of links, that conforms to the DS0 layer standards. The TCP/IP host 1208 also supports the ISLP layer, the PPP/LCP layer, the SNDCF and IPCP layer, the IP layer and the TCP layer as shown. The TCP/IP host also supports the APP I/F layer, which supports the Application program that communicates with the application program running on the subscriber unit 1202. Note that the application program and APP I/F are not run on the IWF 1206.

In operation, the application program resident on the TCP/IP host 1208 communicates with the application program resident on the subscriber unit 1202 via the various communication mechanisms and paths in place between the two. In the present example, the TCP/IP host 1208, at the TCP layer, sends a first group of data segments and remains inactive until the ACK for the first segments is received. The TCP layer is responsible for guaranteeing that all communications sent by the application program of the TCP/IP host 1208 reach the application program of the subscriber unit 1202. The TCP operates according to a sliding window protocol such that it transmits a number of individual data segments and awaits ACKs for the individual segments within a Round Trip Timer (RTT) period. If the ACK is not received within the RTT period, the segment is retransmitted. The window is slid when the ACK for the first segment is received to the time the second segment was sent, and so on as ACKs for additional segments are received. The IS-99 standard specifies that the Maximum Segment Size (MSS) should be no smaller than 536 bytes. The RTT is generally estimated using Karn's algorithm for exponential back off and the current and previous round trip delay times for successful data communications sent to the subscriber unit 1202.

In a typical operation according to the present invention, the subscriber unit 1202 (e.g., laptop computer 108) establishes a data session with a TCP/IP host 1208. The session is initially setup during data communications that causes a TCH to be allocated as wireless link 1203. However, as the data session progresses, the data requirements of the wireless link 1203 diminish and eventually become idle for a period of time. In response, the BSS 1204 and subscriber unit 1202 interact to deallocate the TCH. However, deallocation of the TCH does not disrupt the link between the subscriber unit 1202 and the TCP/IP host 1208.

Subsequently, the subscriber unit 1202 transmits data (e.g., web page request) to the TCP/IP host 1208. The transmission of such data may be performed on a R-CBCH in a contention based mode. Alternately, the transmission may be performed on the R-CBCH in a subscriber unit initiated designated mode data burst. Likewise, if the TCP/IP host 1208 is expecting data from the subscriber unit 1202, operations may commence wherein the BSS 1204 initiates a base station designated mode operation.

Figure 13:
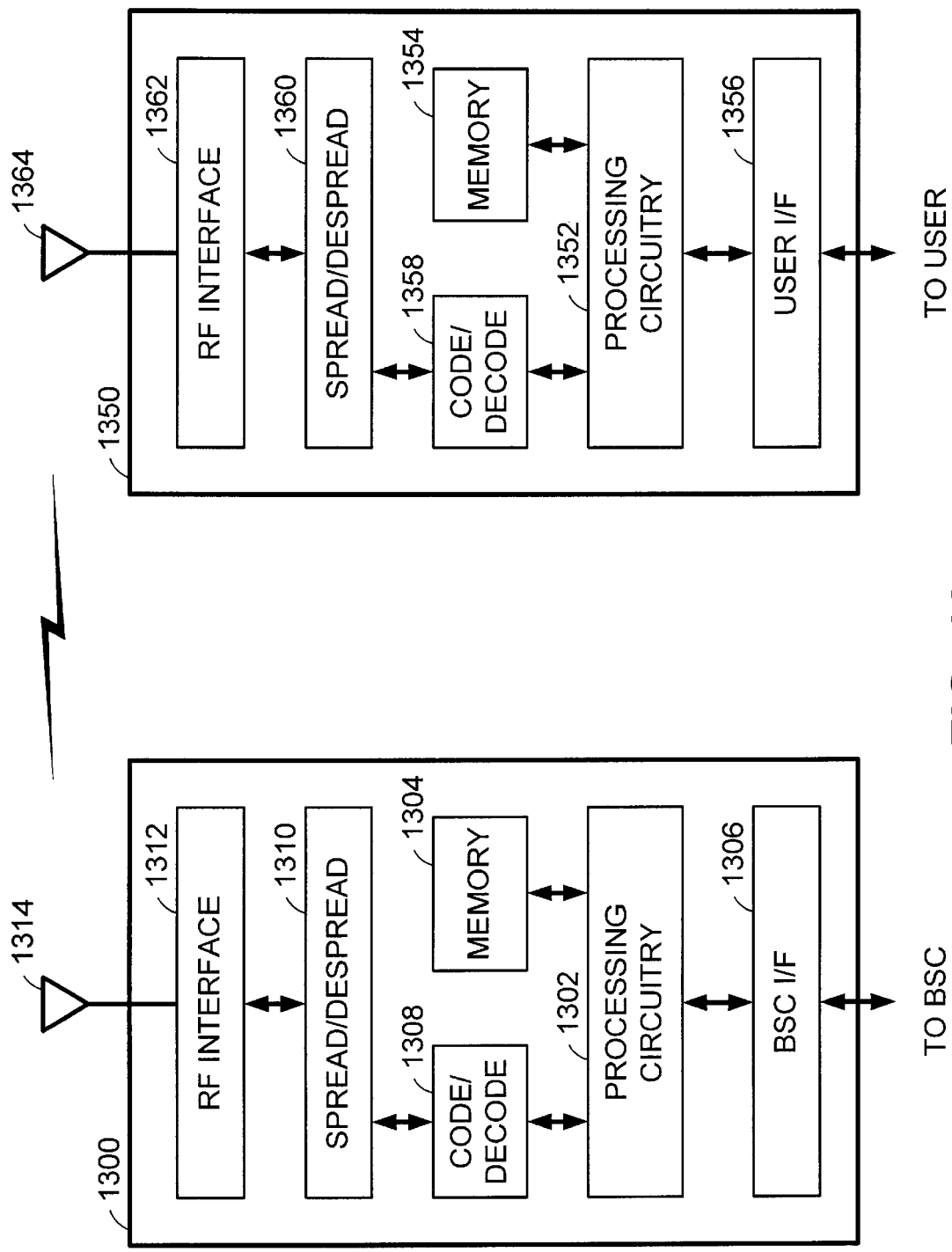
FIG. 13 is a block diagram illustrating generally the components of a base station and of a subscriber unit, each of which operates according to the present invention.

FIG. 13 is a block diagram illustrating generally the components of a base station 1300 and of a subscriber unit 1350, each of which operates according to the present invention. While FIG. 13 shows the components of the base station 1300 and the components of the subscriber unit 1350 to be substantially similar, the construction of these devices in actuality is quite different. However, each of these devices includes the disclosed components or some variation thereof. These basic components allow the base station 1300 and the subscriber unit 1350 to operate according to the previous description made with reference to FIGS. 1 through 12.

The base station 1300 includes processing circuitry 1302 that couples to memory 1304, that couples to a BSC interface 1306 and that couples to a coder/decoder 1308. The processing circuitry 1302 executes instructions that are stored in memory 1304 and interfaces with a coupled BSC via the BSC interface 1306. Further, the processing circuitry 1302 sends communications intended for the subscriber unit 1350 to the coder/decoder 1308.

The processing circuitry 1302 controls each of the components contained in the base station 1300 even though explicit connections are not shown from the processing circuitry 1302 to each of the other components of the base station 1300. For example, the processing circuitry 1302 directs the coder/decoder 1308 to code outgoing transmissions with a Walsh code and directs the coder/decoder 1308 to decode incoming transmissions with a particular Walsh codes. While the description of the components of these components of the base station 1300 are substantially simplified, such coding and encoding is performed on all outgoing and incoming communications, respectively.

The spreader/despreader 1310 couples to the coder/decoder 1308 and also to the Radio Frequency (RF) interface 1312. The spreader/despreader 1312 spreads outgoing transmissions with a PN spreading code and despreads incoming transmissions with a PN spreading code. The RF interface 1312 modulates outgoing transmissions onto an RF carrier and demodulates incoming transmissions. An antenna 1314 couples to the RF interface and services the cell/sector(s) supported by the base station 1300.

The subscriber unit 1350 includes processing circuitry, memory 1354, a user interface and a coder/decoder 1358. Those elements in the subscriber unit 1350 having names common to those elements in the base station 1300 perform similar functions. The user interface 1356 allows a user to operate the subscriber unit 1350. The coder/decoder 1358 couples to the processing circuitry 1352 as well as the spreader/despreader 1360. The spreader/despreader 1360 couples to an RF interface 1362, which couples to an antenna 1314.

The components of the subscriber unit 1350 may be contained in a stand-alone device. However, these components could also be contained upon a PCMCIA card that couples to a laptop computer. Thus, the components of the subscriber unit 1350 illustrated support those operations previously described herein. However, these components may support additional operations as well that are not described herein.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A base station that supports communications with a plurality of subscriber units in a CDMA wireless communication system, the base station comprising:
   an antenna;
   a radio frequency interface coupled to the antenna;
   a spreader/despreader coupled to the radio frequency interface;
   a coder/decoder coupled to the spreader/despreader;
   processing circuitry coupled to the coder/decoder;
   memory coupled to the processing circuitry;
   a base station controller interface coupled to the processing circuitry;
   the base station supporting a reverse link contention based channel;
   in a first operation, the base station receiving a reservation request from a subscriber unit for a designated mode data burst;
   in the first operation, the base station scheduling the designated mode data burst based upon the reservation request;
   in a second operation, the base station scheduling the designated mode data burst from the subscriber unit without receiving a corresponding reservation request; and
   the base station receiving the designated mode data burst on the reverse link contention based channel.

2. The base station of claim 1, wherein the base station further receives contention based transmissions from the subscriber unit on the reverse link contention based channel.

3. The base station of claim 1, wherein the reverse link contention based channel comprises a reverse access channel.

4. The base station of claim 1, wherein the reverse link contention based channel comprises a reverse common control channel.

5. The base station of claim 1, wherein the base station further supports traffic channel data communications with the subscriber unit.

6. The base station of claim 5, wherein:
   the base station and subscriber unit initiate a data session using a traffic channel; and
   the base station services subsequent transmissions from the subscriber unit in the data session on the reverse link contention based channel.

7. The base station of claim 1, wherein operation of the base station is substantially compliant with CDMA 2000 standardized operations.

8. A subscriber unit for operating within a CDMA wireless communication system that supports a plurality of subscriber units and that includes a base station, the subscriber unit comprising;
   an antenna;
   a radio frequency interface coupled to the antenna;
   a spreader/despreader coupled to the radio frequency interface;
   a coder/decoder coupled to the spreader/despreader;
   processing circuitry coupled to the coder/decoder;
   memory coupled to the processing circuitry;
   a user interface coupled to the processing circuitry;
   in a first operation, the subscriber unit communicating with the base station to reserve a designated mode data burst on a reverse link contention based channel;
   in a second operation, the base station initiating the designated mode data burst from the subscriber unit; and
   the subscriber unit transmitting the designated mode data burst to the base station on the reverse link contention based channel.

9. The subscriber unit of claim 8, wherein the subscriber unit further transmits contention based transmissions to the base station on the reverse link contention based channel.

10. The subscriber unit of claim 8, wherein the reverse link contention based channel comprises a reverse access channel.

11. The subscriber unit of claim 8, wherein the reverse link contention based channel comprises a reverse common control channel.

12. The subscriber unit of claim 8, wherein the subscriber unit further supports traffic channel data communications with the base station.

13. The subscriber unit of claim 12, wherein:
   the base station and subscriber unit initiate a data session using a traffic channel; and
   the subscriber unit transmits subsequent transmissions to the base station in the data session on the reverse link contention based channel.

14. The subscriber unit of claim 8, wherein operation of the subscriber unit is substantially compliant with CDMA 2000 standardized operations.

15. A method for operating a base station within a CDMA wireless communication system that supports a plurality of subscriber units, the method comprising:
   supporting a reverse link contention based channel;
   in a first operation, receiving a reservation request from a subscriber unit for a designated mode data burst;
   in a second operation, initiating the designated mode data burst from the subscriber unit without receiving a corresponding reservation request;
   scheduling the designated mode data burst; and
   receiving the designated mode data burst on the reverse link contention based channel.

16. The method of claim 15, wherein the base station further receives contention-based transmissions from the subscriber unit on the reverse link contention based channel.

17. The method of claim 15, wherein the reverse link contention based channel comprises a reverse access channel.

18. The method of claim 15, further comprising:
   initiating a data session using a traffic channel; and
   continuing the data session on the reverse link contention based channel.

19. The base station of claim 15, further comprising operating the base station is compliance with CDMA 2000 standardized operations.

20. A method for operating a subscriber unit within a CDMA wireless communication system that includes a base station and that supports a plurality of subscriber units, the method comprising:
   in a first operation, sending a designated mode data burst reservation request to the base station to reserve a designated mode data burst on a reverse link contention based channel;
   in the first operation receiving a designated mode assignment from the base station based upon the reservation request sent to the base station;

in a second operation, receiving a designated mode assignment that does not correspond to a designated mode data burst reservation request; and transmitting a designated mode data burst to the base station on the reverse link contention based channel.

21. The method of claim 20, further comprising transmitting contention-based transmissions to the base station on the reverse link contention based channel.

22. The method of claim 20, wherein the reverse link contention based channel comprises a reverse access channel.

23. The method of claim 20, wherein the reverse link contention based channel comprises a reverse common control channel.

24. The method of claim 20, further comprising:
initiating a data session using a traffic channel; and
continuing the data session on the reverse link contention based channel.

25. The method of claim 20, further comprising operating the subscriber unit in compliance with CDMA 2000 standardized operations.

* * * * *